Figure 1:
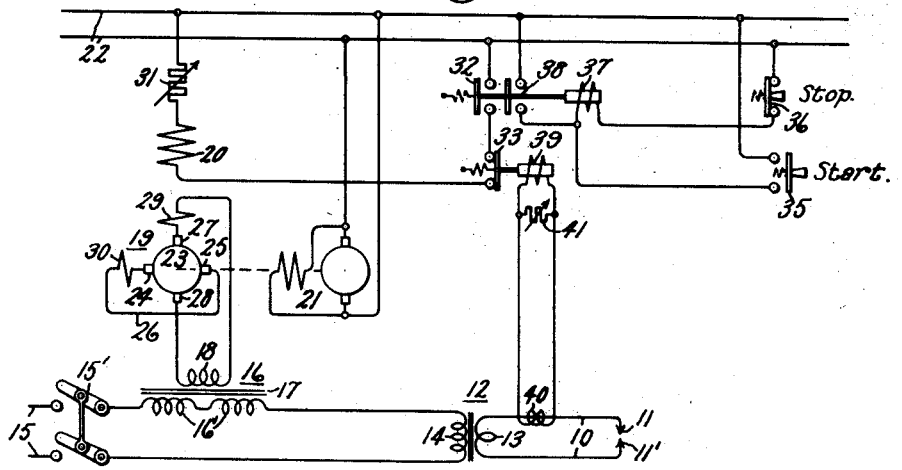

Jan. 27, 1942.    M. A. EDWARDS    2,271,223
ELECTRIC CONTROL CIRCUIT
Filed Feb. 1, 1940

Inventor:
Martin A. Edwards,
by Harry E. Dunham
His Attorney.

Patented Jan. 27, 1942

2,271,223

UNITED STATES PATENT OFFICE 2,271,223

ELECTRIC CONTROL CIRCUIT

Martin A. Edwards, Scotia, N. Y., assignor to General Electric Company, a corporation of New York Application February 1, 1940, Serial No. 316,788

12 Claims. (Cl. 171—242)

My invention relates to electric control circuits and more particularly to an improved arrangement for controlling the flow of current to a load circuit which may comprise the welding electrodes of an electric resistance welding machine.

Wherever one of the various methods of high-speed electric resistance welding can be applied, for example, where spot-welding or line-welding machines are used, it is periodically necessary to interrupt the circuit during the welding operation to form the plurality of spaced or overlapped welds. The means capable of interrupting the circuit must be able to do so a great many times per minute. Even at low speeds of operation, the use of mechanical switches for accomplishing this purpose have proved unsatisfactory and, where the welding circuit must be made and broken several hundred times per minute, they are entirely unsuitable.

Also, in butt welding and more specifically in the flash-welding type where the resistance at the junction is used as a means for generating the welding heat, it has been common practice to use large contactors in the primary circuit of the welding transformer to control the welding time. However, in this type of weld, at the time the metal fuses, there is practically a short circuit on the welding transformer and, when contactors are used to interrupt the circuit, they must do so under this very heavy load or short-circuit current condition, which tends to destroy them causing very high maintenance costs. Furthermore, sufficient arcing at the contactors often occurs under these conditions so that it is impossible to interrupt the circuit with the usual type of contactor.

The use of saturable reactors for such control purposes has been proposed but was found unsatisfactory for these high speed resistance welding operations due to the long interval of time required to obtain substantial variations in the reactance thereof by virtue of the long time constant.

It is an object of my invention to provide a new and improved current-controlling arrangement comprising a saturable reactor provided with quick response means for varying the reactance thereof which will replace the contactors heretofore used in such control circuits and substantially eliminate the necessity of servicing or replacement of parts.

A further object of my invention is to provide an improved current-controlling arrangement having a very high maximum speed limit for making and breaking the welding circuit in electric resistance welding machines.

Further objects and advantages of my invention will become apparent as the following description proceeds and the features of novelty which characterize my invention will be pointed out with particularity in the claims annexed to and forming a part of this specification.

Figure 2:
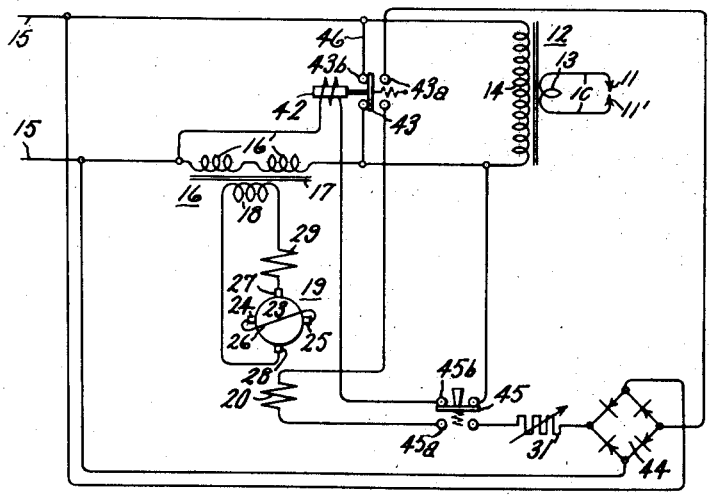

For a better understanding of my invention, reference may be had to the accompanying drawing in which Fig. 1 diagrammatically illustrates an electric control circuit embodying my invention, and Fig. 2 represents a modification thereof.

Referring now to Fig. 1 of the drawing, I have illustrated herein my invention as applied to an arrangement for controlling the flow of current to a load circuit 10. It will be understood by those skilled in the art that this control scheme may have many uses but I have specifically illustrated it in an arrangement where the load circuit 10 includes the welding electrodes of an electric resistance welding machine of the flash butt-welding type which electrodes are diagrammatically illustrated in Fig. 1 at 11, 11'. The load circuit 10 is energized through an electric translating apparatus comprising transformer 12 whose secondary winding 13 is connected to load circuit 10 and whose primary winding 14 is connected to a suitable source of alternating potential 15 through switch 15' for supplying the necessary energy for load circuit 10. A variable reactance device comprising a saturable reactor 16 is provided to control the impedance to the flow of current from alternating potential source 15 and, consequently, control the current flowing in load circuit 10. This device comprises variable reactance windings 16' connected in series with the primary winding 14 of transformer 12 and wound upon a suitable core 17, schematically shown. The impedance of windings 16' is controlled by controlling the saturation of core 17 and this is accomplished by means of direct-current saturating winding 18 also wound on core 17. Thus, by properly controlling the energization of saturating winding 18, the impedance of windings 16' to alternating current from source 15 may be controlled over a wide range varying from substantially no impedance when core 17 is fully saturated to the maximum impedance of windings 16' when core 17 is completely unsaturated. This maximum impedance is of such magnitude as to allow substantially no current to flow in load circuit 10, or in other words the magnetizing impedance of transformer 12 is designed to be higher than that of saturable reactor 16.

However, the building up of flux in core 17 and especially the decaying of this flux when it is desired to increase the impedance of windings 16' requires a relatively long time so that saturable reactors without additional means are unsuitable for controlling high-speed resistance welding machines, for example, or any other load circuit where high-speed control is necessary. In order that such high-speed control of the impedance of windings 16' may be obtained, I control the flow of current in saturating winding 18 by variably energizing it from direct-current dynamoelectric machine 19, which is of the type that utilizes armature reaction as the primary source for its excitation. This type of dynamoelectric machine may be made to provide a controllable variable voltage and variable current characteristic with a very high rate of response and high amplification ratio. Therefore, this armature excited dynamoelectric machine 19 may be termed "an exciter" for controlling saturating winding 18, which amplifies the variations in current transmitted to its control field winding 20. Direct-current dynamoelectric machine 19 is arranged to be driven as a generator by prime mover 21 illustrated as a shunt excited dynamoelectric machine energized from a suitable source of direct current 22.

In order to obtain this high amplification ratio, armature reaction type of dynamoelectric machine 19 may be provided with an armature winding and commutator 23, schematically shown. With this type of excitation system, two sets of brushes are provided displaced from one another by ninety electrical degrees. One set of primary brushes 24 and 25 are short circuited or connected together by a conductor 26 of low resistance and provide a path for the short-circuit current which produces the primary component of the exciting flux of the machine. The other set of brushes, including secondary brushes 27 and 28, produce a voltage which varies as the energization of the control field winding 20 and provide a secondary circuit through the armature. The voltage appearing across secondary brushes 27 and 28 is an amplified voltage relative to the voltage or current of the control field winding 20. When brushes 27 and 28 are connected to a load, such as saturating winding 18 of saturable reactor 16, a load current will flow, producing a secondary armature reaction in dynamoelectric machine 19.

Dynamoelectric machine 19 may also be provided with additional windings, for example, field exciting winding 29 may be provided in series with the circuit through brushes 27 and 28 which is arranged to provide a component of magnetic excitation in opposition to the secondary armature reaction produced by current flowing in the circuit associated with brushes 27 and 28, thereby reducing the secondary armature reaction flux and, hence, increasing the sensitivity of control field winding 20. A field exciting winding 30 connected in series with the primary brushes 24 and 25 may also be provided so as to produce a component of excitation in the direction of the primary armature reaction, whereby the primary armature current for obtaining a given secondary voltage may be substantially reduced.

An armature reaction dynamoelectric machine of the type described above is disclosed and broadly claimed in United States Letters Patent 2,227,992, granted January 7, 1941, upon the joint application of Ernst F. W. Alexanderson and myself, and assigned to the same assignee as the present invention.

The advantage of using an armature reaction type of dynamoelectric machine 19 as a means of controlling the impedance of variable reactance windings 16' resides in the small amount of control power necessary and the extremely rapid response obtainable for controlling load circuit 10. To get maximum speed of control of the variation of the impedance of windings 16', the load circuit of dynamoelectric machine 19, including saturating winding 18, is designed so as to give the most favorable L/R ratio and, hence, a short time constant. Occasionally to obtain this favorable ratio it may be necessary to insert resistance in series with saturating winding 18 and increase the voltage output of dynamoelectric machine 19. The control power for dynamo-electric machine 19 for energizing field 20 is obtained from any suitable source of direct current, such as source 22. Any suitable means such as variable resistor 31, connected in series with winding 22 may be arranged to adjust the energization of winding 20 and a plurality of contactors 32 and 33, to be described hereinafter, control the excitation thereof.

When the maximum current in load circuit 10 is desired, resistance 31 is adjusted so that the output of dynamoelectric machine 19 completely saturates the core 17 of saturable reactor 16 so that windings 16' afford substantially no impedance to current flowing in the primary winding 14 of transformer 12. For smaller current values in load circuit 10, the core 17 is saturated to a lesser degree by varying resistance 31. Whenever contactors 32 or 33 open the circuit to field exciting winding 20, the remaining component of secondary flux produced by current flowing in the secondary circuit is such as to cause reversal of the potential applied to saturating winding 18 connected in circuit with the secondary brushes 27 and 28 so that the flux in core 17 is forced to zero very rapidly.

It will be understood that those skilled in the art that any suitable control means for controlling the energization of field winding 20 of dynamoelectric machine 19 may be provided, such, for example, as a circuit employing a plurality of discharge valves, or a control circuit embodying contactors 32 and 33 illustrated in Fig. 1 for controlling the impedance of windings 16' of saturable reactor 16. Contactor 32 is arranged to be controlled manually by suitable "start" and "stop" buttons 35 and 36, respectively, which control the energization of solenoid 37 from direct-current source 22. Solenoid 37 is directly connected to contactor 32 and, in addition, operates its own seal-in switch 38. Contactor 33, on the other hand, is arranged to be automatically controlled in accordance with an operating characteristic of load circuit 10. When my invention is applied to an electric resistance welding apparatus of the flash-welding type as specifically shown in Fig. 1, contactor 33 may be operated by solenoid 39 arranged to be energized through current transformer 40 associated with load circuit 10. Thus, when the butt weld has been accomplished, secondary winding 13 of transformer 12 is substantially short circuited through the work piece between electrodes 11 and 11' and a very high current flows in load circuit 10. By suitably adjustably variable resistance 41 connected across the winding of solenoid 39, a predetermined current flowing in load circuit 10 will cause solenoid 39 to open contactor 33, whereby the circuit for energizing field winding 20 of dynamoelectric machine 19 is interrupted and the impedance of variable reactance windings 16' which may have been substantially zero while field windings 20 was energized depending on the setting of resistance 31, is increased very rapidly so as to substantially interrupt the energy supplied to load circuit 10.

The operation of the arrangement illustrated in Fig. 1 will be considered starting with the apparatus in the condition illustrated in Fig. 1 with switch 15' in the open position and with prime mover 21 driving dynamoelectric machine 19. Since contactor 32 is in the open position, field winding 20 is deenergized and, hence, no current flows in saturating winding 18. Variable reactance windings 16', therefore, present the maximum impedance to current flowing in the primary circuit of transformer 12 when switch 15' is closed and, therefore, when the work to be welded has been inserted between electrodes 11, 11', substantially no current flows in load circuit 10. If now, the operator manually depresses "start" button 35, solenoid 37 is energized from direct-current circuit 22, whereby contactor 32 and seal-in switch 38, which causes solenoid 37 to remain energized even though "start" button 35 is released, are closed. The closing of contactor 32 connects direct-current source 22 across field control winding 20 through variable resistor 31 and, due to the very rapid response of dynamoelectric machine 19, core 17 of the saturable reactor 16 is completely saturated in a very short interval of time. This substantially reduces the impedance of windings 16' to zero, or to the value determined by the setting of variable resistance 31, whereby the current in load circuit 10 is allowed to flow. As soon as the butt weld of the flash type is completed, a large increase in current flowing in load circuit 10 occurs which energizes solenoid 39 sufficiently to open contactor 33 and interrupt the circuit for control field winding 20. The interruption of this field circuit causes dynamoelectric machine 19 to force the flux in core 17 down to zero very rapidly so as greatly to increase the impedance of windings 16' by virtue of the unsaturated condition of core 17 of saturable reactor 16 and thereby substantially to interrupt the current flowing in load circuit 10, whereby electrodes 11, 11' may be removed from the work piece, not shown, and the process repeated.

Although I have described the control circuit for field winding 20 as specifically adaptable to flash welding, it will be understood by those skilled in the art that this control circuit may be modified in any manner depending upon the particular load applied to load circuit 10. Regardless of the load applied, the saturable reactor 16 including variable reactance windings 16' has the impedance thereof controlled in such a manner by virtue of dynamoelectric machine 19 as to function like a high-speed mechanical contactor energizing or deenergizing load circuit 10 without any of the inherent disadvantages associated with such contactors.

Even though saturable reactor 16 substantially makes and breaks the circuit energizing load circuit 10, nevertheless, the magnetic energy stored in windings 16' and transformer 12, when the saturable reactor is wholly unsaturated and substantially no current flows in load circuit 10 by virtue of the high impedance afforded by windings 16', is such as to cause undesirable arcing when welding electrodes 11, 11' are removed from the work. Such arcing would also occur at switch 15' if it were actuated to interrupt the circuit. Accordingly, in Fig. 2, where the corresponding parts of the apparatus are designated by the same reference numerals as in Fig. 1, I have illustrated a modification of my invention wherein a relay 42 operatively connected to contactor 43 is energized at the proper time automatically to bypass or short circuit the primary winding 14 of translating apparatus 12, whereby the load circuit 10 is completely deenergized so that the welding electrodes 11, 11' may be removed from the work without any arcing and so that it is unnecessary to provide a switch such as 15', shown in Fig. 1. Armature reaction dynamoelectric machine 19 is again provided for controlling the energization of saturating winding 18 of saturable reactor 16 in the same manner as in Fig. 1. This dynamoelectric machine may be driven by any suitable prime mover, not shown, similar, for example, to the prime mover 21 of Fig. 1. Control field winding 20 for armature reaction dynamoelectric machine 19 is arranged to be energized with direct current obtained through full wave rectifier 44 from alternating-current source 15. Contactor 43 and a manually operable double-throw switch 45 are connected in series with control field winding 20 by bridging contacts 43a and 45a, respectively, whereby load circuit 10 is energized by virtue of the decrease in impedance of variable reactance windings 16' of saturable reactor 16, as has been described in detail heretofore. Double-throw switch 45 normally bridges contacts 45b so as to connect relay 42 across variable reactance windings 16' of saturable reactor 16, the potential of which when core 17 is unsaturated is sufficient to pull contactor 43 away from contacts 43a and cause contacts 43b to be bridged, which are connected in a bypassing or short-circuiting line 46 for the primary winding 14 of transformer 12.

The operation of the modification of my invention illustrated in Fig. 2 will be only briefly described in view of the detailed description set forth in connection with Fig. 1. When the circuit is in the condition illustrated in Fig. 2 with dynamoelectric machine 19 driven by a suitable prime mover, substantially no current flows in saturating winding 18 of saturable reactor 16 since control field winding 20 is deenergized. Furthermore, relay 42 is energized by virtue of the potential of source 15 appearing across variable reactance windings 16' and the contactor 43 bridges contacts 43b, whereby primary winding 14 of transformer 12 is bypassed or short-circuited through connection 46. When it is desired to energize load circuit 10, double-throw switch 45 is depressed, bridging contacts 45a and opening contacts 45b, whereupon relay 42 is deenergized and contactor 43 opens the contacts 43b of bypassing connection 46 and bridges contacts 43a. Thereupon, the control field winding 20 is energized and the impedance of windings 16' is rapidly reduced. When switch 45 is released, the circuit of field winding 20 is broken and hence, by virtue of the operation of dynamoelectric machine 19 causing desaturation of saturable reactor 16, load circuit 10 is substantially deenergized. At the same time, relay 42 is energized across windings 16' and bypassing connection 46 is completed so that electrodes 11 and 11' may be separated without arcing.

It will be understood by those skilled in the art that, while I have illustrated and described two particular embodiments of my invention, modifications thereof will occur to those skilled in the art. I desire it to be understood, therefore, that my invention is not to be limited to the particular arrangements disclosed and I intend in the appended claims to cover all modifications which do not depart from the spirit and scope of my invention.

What I claim as new and desire to secure by Letters Patent of the United States is:

1. In combination, a load circuit, an alternating-current supply circuit, an electric translating apparatus interconnecting said circuits, means for controlling said load circuit comprising a reactance device connected in series therewith, means including a direct-current winding for said reactance device for varying the impedance thereof, and quick response means connected so as to energize said direct-current winding so that rapid changes in the impedance of said reactance device may be obtained, said quick-response means causing a rapid reversal of the energization of said direct-current winding so that the flux in said reactance device is rapidly forced to attain substantially a zero value.

2. In a control apparatus for a load circuit, an alternating-current supply circuit connected so as to energize said load circuit, means for controlling said load circuit comprising a saturable reactor connected in series therewith, a direct-current saturating winding for said reactor, and quick response means for controlling the energization of said saturating winding forcing a very rapid buildup or decay of flux in said saturable reactor by causing a rapid reversal of the energization of said saturating winding so that high-speed changes in the impedance thereof may be obtained.

3. In combination, a load circuit, an alternating-current supply circuit, an electric translating apparatus interconnecting said circuits, means for controlling said load circuit comprising a reactance device connected in series with said translating apparatus, means including a direct-current winding for said reactance device for varying the impedance of said device, an armature reaction dynamo-electric machine having a high rate of response for energizing said direct-current winding, and means for controlling the operation of said dynamoelectric machine so as to cause a rapid reversal of the energization of said direct-current winding whereby high-speed control of said load circuit may be obtained.

4. In combination, a load circuit, an alternating-current supply circuit, an electric translating apparatus interconnecting said circuits, means for controlling said load circuit comprising a saturable reactor connected in series with said translating apparatus, means including a saturating winding for said reactor for varying the impedance thereof, an armature reaction dynamoelectric machine having a high rate of response for energizing said saturating winding, and means for controlling the operation of said dynamoelectric machine so as to cause a rapid reversal of the energization of said saturating winding to obtain high-speed control of said load circuit.

5. In combination, a transformer provided with primary and secondary windings, a load device connected to said secondary winding, and a reactance device connected in series relation with said primary winding of said transformer, said reactance device comprising a saturable reactor having a direct-current saturating winding energized from a quick response apparatus for controlling said impedance, said quick-response apparatus being so constructed and arranged as to cause a rapid reversal of the energization of said direct-current saturating winding.

6. In combination, a load device, a first circuit connecting said load device to an alternating-current supply circuit, high-speed means for controlling said first circuit including a saturable reactor connected between said supply circuit and said first circuit, means including a direct-current saturating winding associated with quick response energization means for varying the impedance of said saturable reactor by causing rapid reversal of the energization of said direct-current saturating winding whereby high-speed control of the current flowing in said first circuit is obtained, and means responsive to an operating characteristic of said load device for controlling said quick response energization means.

7. In combination, a load circuit, an alternating-current supply circuit, an electric translating apparatus interconnecting said circuits, means for controlling said load circuit comprising a reactance device connected in series with said load circuit for controlling the current supplied to said load circuit, means including a direct-current winding for said reactance device for varying the impedance thereof, an armature reaction generator for controlling the energization of said direct-current winding by causing a rapid reversal of the energization thereof so that high-speed control of said current supplied to said load circuit may be obtained, and means responsive to an operating characteristic of said load circuit for controlling said armature reaction generator.

8. In combination, a load circuit, an alternating-current supply circuit, an electric translating apparatus interconnecting said circuits, means for controlling said load circuit comprising a reactance device connected in series therewith, means including a direct-current winding for said reactance device for varying the impedance thereof, means for bypassing said alternating-current supply circuit around said electric translating apparatus when said reactance device is adjusted for maximum impedance so that said load circuit is completely deenergized, and quick response means for controlling the energization of said direct-current winding so that rapid changes in the impedance of said reactance device may be obtained.

9. In a control apparatus for a load circuit, an alternating-current supply circuit connected so as to energize said load circuit, a high-speed switching arrangement for controlling said load circuit comprising a saturable reactor including a direct-current saturating winding for varying the impedance of said saturable reactor, and means for bypassing said alternating current supply circuit around said load circuit when said saturable reactor is wholly unsaturated so as to present the maximum impedance to current so that said load circuit is completely deenergized.

10. In combination, a load circuit, an alternating-current supply circuit, an electric translating apparatus interconnecting said circuits, a high-speed switching arrangement for controlling said load circuit comprising a saturable reactor connected in series with said translating apparatus, means including a saturating winding for said reactor for varying the impedance thereof, an armature reaction dynamoelectric machine having a high rate of response for energizing said saturating winding, means for controlling the operation of said dynamoelectric machine to obtain high-speed changes in the impedance of said saturable reactor, and consequent high speed of control of said load circuit, and means for automatically bypassing said alternating-current supply circuit around said translating apparatus when no current flows in the saturating winding of said saturable reactor so that said load circuit is completely deenergized.

11. In a system comprising a load device, a first circuit connecting said load device to an alternating-current supply circuit, high-speed means for controlling said first circuit including a saturable reactor connected between said supply circuit and said first circuit, means including a direct-current saturating winding associated with quick response energization means for varying the impedance of said saturable reactor whereby control of the current flowing in said first circuit is obtained, and means responsive to an operating condition of said saturable reactor for bypassing said alternating-current supply circuit around said first circuit when no current flows in said saturating winding so that said load device is completely denergized.

12. In combination, a transformer provided with primary and secondary windings, a load device connected to said secondary windings, a reactance device connected in series relation with said primary winding of said transformer, said reactance device comprising a saturable reactor having a direct-current saturating winding, an alternating-current supply circuit for energizing said transformer through said reactance device, an armature reaction generator having a high rate of response for energizing the direct-current saturating winding of said reactance device for varying the impedance thereof over a very wide range whereby high-speed control of the current supplied to said load device may be obtained, and means responsive to the flow of current to said load device for controlling the operation of said armature reaction generator.

MARTIN A. EDWARDS.